(12) United States Patent
Bartz

(10) Patent No.: US 11,713,549 B2
(45) Date of Patent: Aug. 1, 2023

(54) ELECTRIC SCOOP AND BAGGER

(71) Applicant: Robert Bartz, Lancaster, NY (US)

(72) Inventor: Robert Bartz, Lancaster, NY (US)

(*) Notice: Subject to any disclaimer, the term of this patent is extended or adjusted under 35 U.S.C. 154(b) by 265 days.

(21) Appl. No.: 17/313,697

(22) Filed: May 6, 2021

(65) Prior Publication Data
US 2021/0348349 A1 Nov. 11, 2021

Related U.S. Application Data

(60) Provisional application No. 63/020,725, filed on May 6, 2020.

(51) Int. Cl.
*E01H 1/12* (2006.01)
*A01K 23/00* (2006.01)

(52) U.S. Cl.
CPC ......... *E01H 1/1206* (2013.01); *A01K 23/005* (2013.01); *E01H 2001/1286* (2013.01); *E01H 2001/1293* (2013.01)

(58) Field of Classification Search
CPC ............ E01H 1/1206; E01H 2001/128; E01H 2001/1293; E01H 2001/1286; A01K 23/005
USPC ....................................................... 294/1.4
See application file for complete search history.

(56) References Cited

U.S. PATENT DOCUMENTS

| | | | | |
|---|---|---|---|---|
| 4,119,337 A * | 10/1978 | Sherhandt | ............. | E01H 1/1206 294/1.4 |
| 4,200,321 A * | 4/1980 | Warkentin | ............ | E01H 1/1206 294/1.4 |
| 5,320,393 A * | 6/1994 | Cortinas | ............... | E01H 1/1206 294/1.4 |
| 5,540,470 A * | 7/1996 | Lu | ......................... | E01H 1/1206 294/1.4 |
| 5,667,264 A * | 9/1997 | Tanahara | .............. | E01H 1/1206 294/1.4 |
| 6,135,520 A * | 10/2000 | Miller | ................... | E01H 1/1206 294/1.4 |
| 6,796,587 B2 * | 9/2004 | Tsou | ..................... | E01H 1/1206 294/1.4 |
| 8,449,007 B2 * | 5/2013 | Farmer | ................. | E01H 1/1206 294/1.4 |
| 2007/0024070 A1 * | 2/2007 | Aihiokhai | ............. | E01H 1/1206 294/1.4 |

* cited by examiner

*Primary Examiner* — Paul T Chin
(74) *Attorney, Agent, or Firm* — Woods Oviatt Gilman LLP; Katherine H. McGuire, Esq.

(57) ABSTRACT

Method and apparatus including a scoop having an elongated frame with handle at the top for manipulating the the bottom of the scoop along the ground at the location of excrement to be scooped. The frame includes a bifurcated double pole section to which a disposable bag may be attached. The bag has an opening which faces the front of a rotatable paddle located at the end of the single pole part of the frame. The rotatable paddle is operated via a switch located adjacent the top handle. A shield is positioned about the paddle to prevent excrement being directed rearwardly of the frame. The rotatable paddle includes at least one but preferably two and more preferably three paddles which are spaced about a central axle which itself extends perpendicular to the single pole part of the frame.

10 Claims, 2 Drawing Sheets

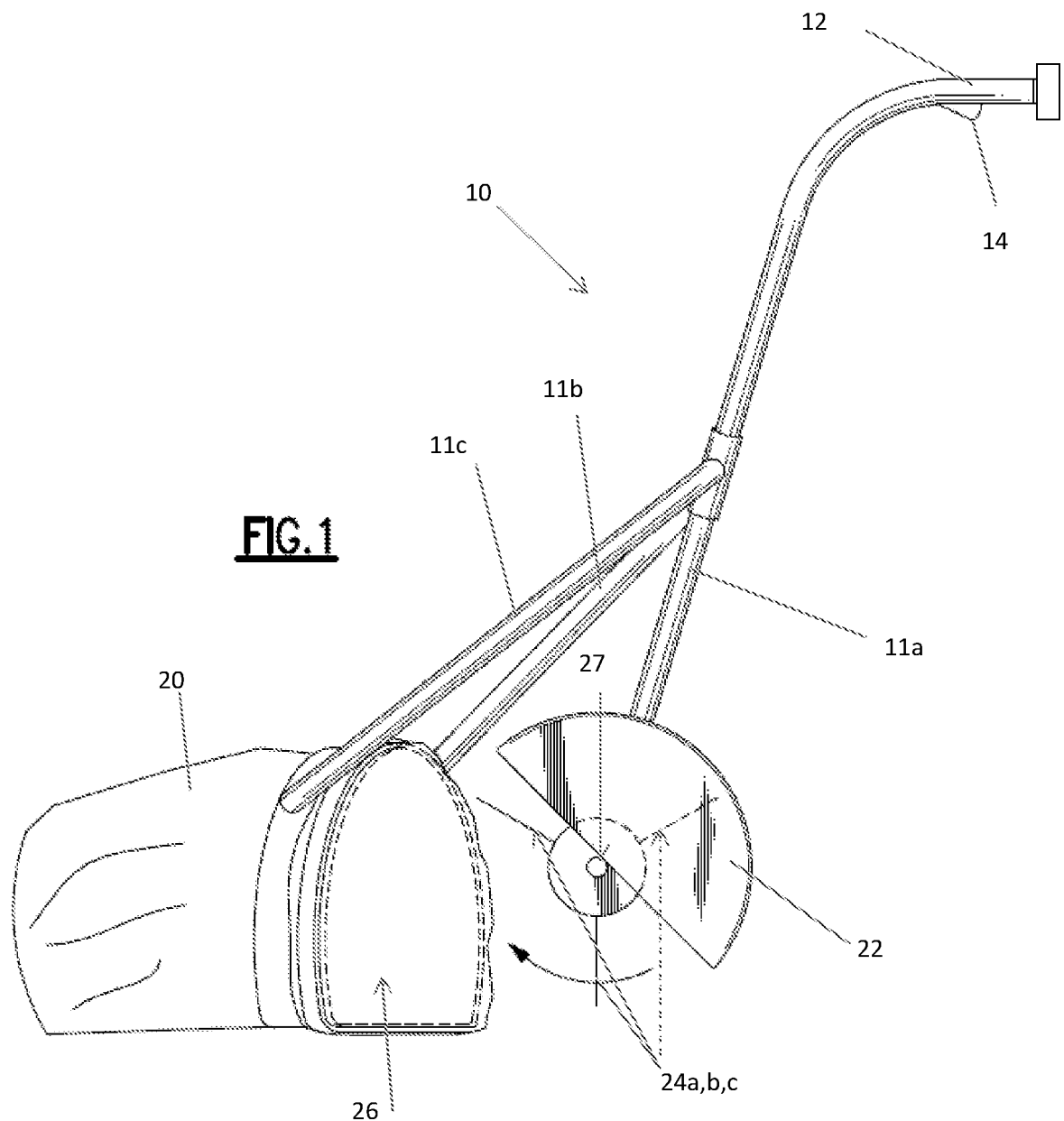

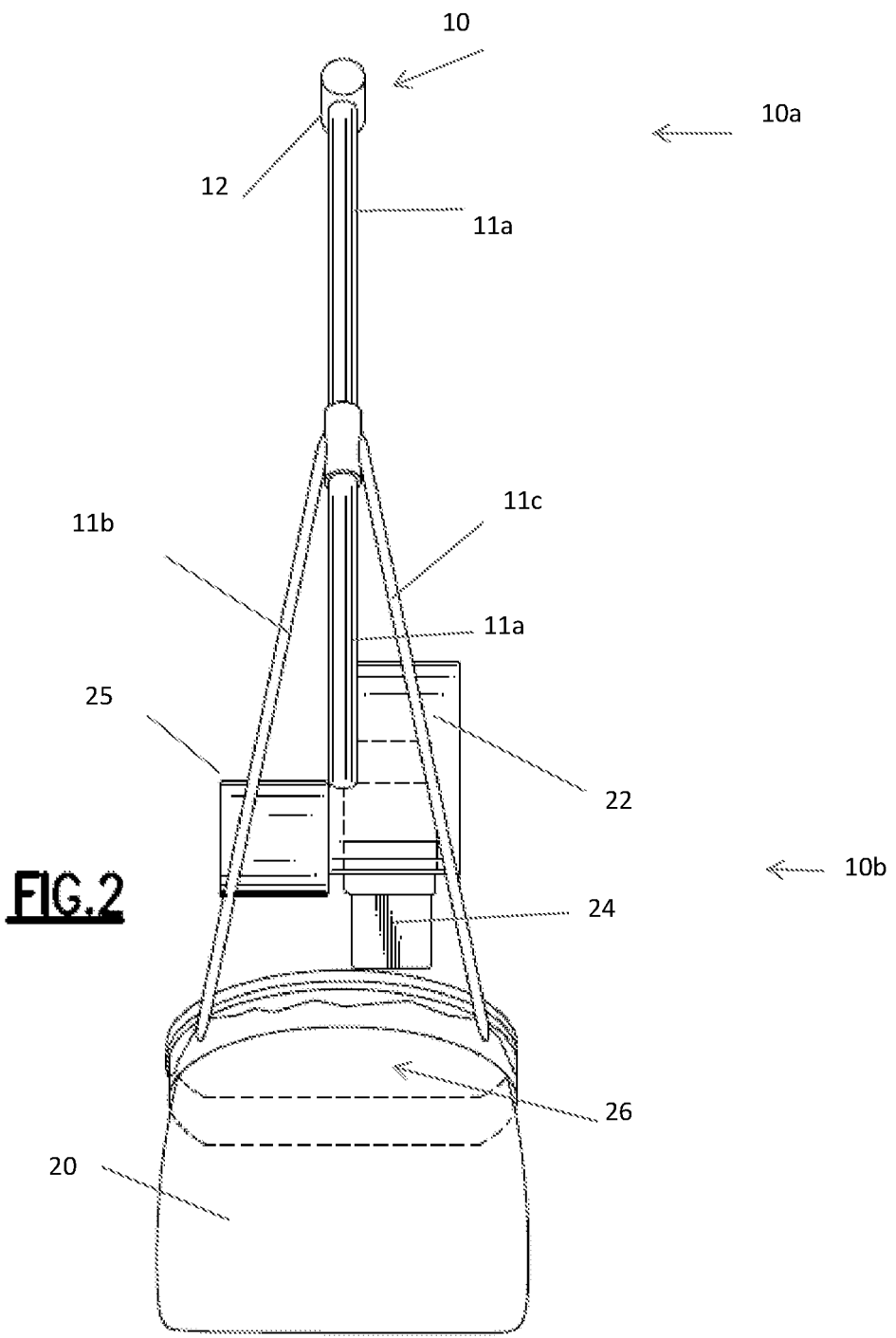

ELECTRIC SCOOP AND BAGGER

BACKGROUND OF THE INVENTION

The present invention relates to an electric scoop and bagger particularly suited for picking up and disposing of animal (e.g., dog) excrement.

SUMMARY OF THE INVENTION

The present invention provides in a first aspect a scoop having an elongated frame with handle at the top for manipulating the the bottom of the scoop along the ground at the location of excrement to be scooped. The frame includes a bifurcated double pole section to which a disposable bag may be attached. The bag has an opening which faces the front of a rotatable paddle located at the end of the single pole part of the frame. The rotatable paddle is operated via a switch located adjacent the top handle. A shield is positioned about the paddle to prevent excrement being directed rearwardly of the frame. The rotatable paddle includes at least one but preferably two and more preferably three paddles which are spaced about a central axle which itself extends perpendicular to the single pole part of the frame.

Additional objects, advantages and novel aspects of the present invention will be set forth in part in the description which follows, and will in part become apparent to those in the practice of the invention, when considered with the attached figures.

DESCRIPTION OF THE DRAWING FIGURES

FIG. 1 is a side elevational view of a first embodiment of the invention; and

FIG. 2 is a front elevational view thereof.

The above-mentioned and other features and advantages of this invention, and the manner of attaining them, will become apparent and be better understood by reference to the following description of the invention in conjunction with the accompanying drawing, wherein:

DETAILED DESCRIPTION OF A PREFERRED EMBODIMENT

Referring to FIGS. 1 and 2, the present invention provides a scoop 10 having an elongated frame with handle 12 adjacent the top 10a for manipulating the bottom section 10b of the scoop along the ground at the location of excrement (not shown) to be scooped.

The frame includes a single pole section 11a and a bifurcated double pole section 11b,11c to which a disposable bag 20 may be removably attached using appropriate securing elements (e.g. clips (not shown)). The bag 20 has an opening 26 which faces the front of a rotatable paddle 24 located adjacent the bottom end of the single pole section 11a.

The rotatable paddle 24 is operated via a switch 14 located adjacent the top handle 12. The switch is connected to a motor 25 which may be positioned in any desired location such as adjacent paddle 24 as seen in FIG. 2, for example. The motor 25 may be powered by a rechargeable battery or a hard wired electrical cord (not shown).

A shield 22 is positioned about the paddle to the extent necessary to prevent excrement being directed away from the bag 20. The rotatable paddle 24 includes at least one but preferably two and more preferably three paddles 24a-24c which are spaced about a central axle 27 which extends perpendicular to the single pole part 11a of the frame.

Upon activating switch 14, paddle 24 rotates in a direction (see the curved arrow in FIG. 1) which scoops and directs excrement through opening 26 and into bag 20. Once finished scooping, the user removes and disposes of bag 20 which contains the excrement. Scoop 10 may be washed as necessary (e.g., using a garden hose) and used again with another bag 20 attached to the frame in the manner described above.

While the apparatus, methods and systems have been shown and described with reference to certain preferred embodiments thereof, it will be understood by those skilled in the art that various changes in form and details may be made therein without departing from the full spirit and scope of the invention as defined by the claims which follow.

What is claimed is:

1. A scoop for picking up and disposing of animal excrement by directing the excrement into a disposable bag having an opening and adapted for removable attachment to the scoop, said scoop comprising:
   a) a bottom section;
   b) an elongated frame attached to said bottom section, said elongated frame having:
      i) a top end with a handle adjacent said top end;
      ii) a single pole section having a bottom end and a bifurcated double pole section;
   c) at least one rotatable paddle located adjacent said bottom end of said single pole section;
   d) a motor mounted to said elongated frame;
   e) a switch mounted to said elongated frame adjacent said handle, said switch operably connected to said motor, wherein said at least one rotatable paddle is selectively operable to rotate via manual operation of said switch,
   whereby a user may removably attach a disposable bag to said scoop with the bag opening facing said at least one rotatable paddle;
   whereby a user may direct said bottom section of said scoop along the ground at the location of excrement to be scooped; and
   whereby the user may activate said switch thereby causing said at least one paddle to rotate in a direction which scoops and directs excrement into the bag and whereupon the user may remove and dispose the bag which contains the scooped excrement.

2. The scoop of claim 1 and further comprising a shield positioned adjacent said at least one rotatable paddle, said shield adapted to prevent excrement being directed away from the disposable bag when a user activates said switch which causes said motor to rotate said at least one rotatable paddle.

3. The scoop of claim 1 wherein said scoop has first, second and third rotatable paddles spaced about a central axle, said central axle mounted to and extending perpendicular to said single pole of the frame.

4. The scoop of claim 2 wherein said scoop has first, second and third rotatable paddles spaced about a central axle, said central axle mounted to and extending perpendicular to said single pole of the frame.

5. The scoop of claim 3 and further comprising a shield positioned adjacent said at least one rotatable paddle, said shield adapted to prevent excrement being directed away from the disposable bag when a user activates said switch which causes said motor to rotate said at least one rotatable paddle.

6. A method of scooping excrement into a disposable bag comprising the steps of:

a) providing a scoop having a bottom section;
b) providing and removably attaching a disposable bag having an opening to the scoop;
c) providing an elongated frame attached to said bottom section, said elongated frame having:
   i) a top end with a handle adjacent said top end;
   ii) a single pole section having a bottom end and a bifurcated double pole section;
d) providing at least one rotatable paddle located adjacent said bottom end of said single pole section;
e) providing a motor mounted to said elongated frame;
f) providing a switch mounted to said elongated frame adjacent said handle, said switch operably connected to said motor,
wherein said at least one rotatable paddle is selectively operable to rotate via manual operation of said switch,
g) attaching a disposable bag to said scoop with the bag opening facing said at least one rotatable paddle;
h) directing said bottom section of said scoop along the ground at the location of excrement to be scooped; and
i) activating said switch thereby causing said at least one paddle to rotate in a direction which scoops and directs excrement into the bag; and
j) removing and disposing of the bag which contains the scooped excrement.

7. The method of claim 6 and further comprising the step of providing a shield positioned adjacent said at least one rotatable paddle, said shield adapted to prevent excrement being directed away from the disposable bag when a user activates said switch which causes said motor to rotate said at least one rotatable paddle.

8. The method of claim 6 and further comprising the step of providing said scoop with first, second and third rotatable paddles spaced about a central axle, said central axle mounted to and extending perpendicular to said single pole of the frame.

9. The method of claim 7 and further comprising the step of providing said scoop with first, second and third rotatable paddles spaced about a central axle, said central axle mounted to and extending perpendicular to said single pole of the frame.

10. The scoop of claim 8 and further comprising the step of providing a shield positioned adjacent said at least one rotatable paddle, said shield adapted to prevent excrement being directed away from the disposable bag when a user activates said switch which causes said motor to rotate said at least one rotatable paddle.

* * * * *